United States Patent
Walter et al.

(10) Patent No.: US 6,847,615 B1
(45) Date of Patent: Jan. 25, 2005

(54) BAUD RATE DETECTION IN SERIAL DATA TRANSMISSION

(75) Inventors: Ulrich Walter, Munich (DE); Vassil Lolov, Munich (DE)

(73) Assignee: Optimay Corporation (DE)

( * ) Notice: Subject to any disclaimer, the term of this patent is extended or adjusted under 35 U.S.C. 154(b) by 0 days.

(21) Appl. No.: 09/530,664

(22) PCT Filed: Nov. 11, 1998

(86) PCT No.: PCT/EP98/07192
§ 371 (c)(1),
(2), (4) Date: Jul. 25, 2000

(87) PCT Pub. No.: WO99/26384
PCT Pub. Date: May 27, 1999

(30) Foreign Application Priority Data

Nov. 13, 1997 (EP) .............................. 97119892

(51) Int. Cl.[7] .............................. H04J 1/16; H04J 3/16
(52) U.S. Cl. ..................... 370/252; 370/465; 375/222
(58) Field of Search ................................ 370/252, 465, 370/468; 375/222, 355, 356, 225, 369; 455/550.1, 561, 554.2

(56) References Cited

U.S. PATENT DOCUMENTS

| | | | |
|---|---|---|---|
| 5,008,902 A | | 4/1991 | Key et al. |
| 5,008,903 A | * | 4/1991 | Betts et al. .................. 375/221 |
| 5,367,541 A | * | 11/1994 | Barbero ....................... 370/468 |
| 5,490,209 A | * | 2/1996 | Kennedy et al. ............. 375/231 |
| 5,627,858 A | * | 5/1997 | Mak et al. .................... 370/252 |
| 5,631,925 A | * | 5/1997 | Koenzen ...................... 375/225 |
| 5,654,983 A | | 8/1997 | Sauser, Jr. |
| 5,982,837 A | * | 11/1999 | Earnest ........................ 375/377 |

OTHER PUBLICATIONS

Stefano Bodini; "How do autobauding modems work?" dated Aug. 9, 1997, posted to the USENET newsgroup "comp.arch.embedded".
John McDougall; "How do autobauding modems work?" dated Aug. 11, 1997, posted to the USENET newsgroup "comp.arch.embedded".
John Chris Wren; "How do autobauding modems work?" dated Aug. 22, 1997, posted to the USENET newsgroup "comp.arch.embedded".
Bruce Hafford; "How do autobauding modems work?" dated Aug. 22, 1997, posted to the USENET newsgroup "comp.arch.embedded".
Mark Schultz; "How do autobauding modems work?" dated Aug. 25, 1997, posted to the USENET newsgroup "comp.arch.embedded".
A. Nonymous; Autobauding getty for System V (ported from 4BSD); Date: Oct. 28, 1988.

* cited by examiner

Primary Examiner—Andy Lee

(57) ABSTRACT

A method for automatically determining the baud rate of a serial data transmission comprises the steps of setting a receiving device to a first baud rate, processing (65) a first data word received by said receiving device and possibly further information to determine said baud rate of said data transmission, possibly setting (68) said receiving device to a second baud rate in order to enable said receiving device to find the beginning of a subsequent data word in said serial data transmission, and possibly setting (74) said receiving device to said determined baud rate. A corresponding apparatus and a mobile telephone each employs this method. The invention provides an autobauding function which causes little expense in terms of hardware and processing time, and which will correctly synchronize with the serial data transmission even if the transmitted data words immediately follow each other.

20 Claims, 4 Drawing Sheets

BAUD RATE DETECTION IN SERIAL DATA TRANSMISSION

The invention concerns a method and an apparatus for determining the baud rate of a serial data transmission as well as a mobile telephone. The invention may be used for all kinds of applications in which a serial data transmission is established or maintained. In particular, the invention may be used in a compact low-power device such as a mobile telephone in which a single microcontroller executes a plurality of tasks in a time sharing manner.

Modern mobile telephones, especially those according to the GSM standard (GSM=global system for mobile communications), offer a variety of communication services, in particular voice, data and fax services. For the transmission of data and faxes the mobile telephone is connected to a computer (usually a laptop computer), and receives the information to be transmitted therefrom. Known mobile telephones comprise a proprietary interface, which communicates with a special data transmission card inserted in the computer. This approach is quite expensive and requires special hardware, which occupies one card slot of the computer.

It would be more economical and much more practical for the user if he or she could connect the mobile telephone directly to the standard serial port of the computer using a standard communication and/or fax program. A problem with this approach arises from the fact that the computer may communicate in a variety of different data transmission speeds. It would be very annoying for the user if he or she had to configure the mobile telephone manually whenever a serial transmission is established or the transmission speed is changed. The mobile telephone should therefore be able to determine the transmission speed or baud rate (number of transmission steps per second) automatically.

U.S. Pat. No. 5,367,541 (corresponding to EP 0 544 965 A1) discloses a method for setting the asynchronous transmission characteristics of a telecommunication equipment operating at different transmission rates. A first character is received using predetermined transmission parameters, the actual transmission speed is determined on the basis of the received character, and the telecommunication equipment is set to this transmission speed. Then the occurrence of a second character is awaited. Preferably, processing of the second character does not begin before a period of 100 ms has elapsed. This method assumes that a user types a predetermined sequence of characters on a keyboard. It only works if there is a rather long interval between the first two characters, said interval allowing the telecommunication equipment to find the beginning of the second character.

U.S. Pat. No. 5,008,902 discloses a method to determine the baud rate of a data stream by comparison of captured data to known autobaud characters. The data stream is first sampled at a faster data rate than the highest possible baud rate. The sampled data is compared to known data. If a match occurs, the matched baud rate is determined and selected. Such a match also signals that the sample clock is correctly synchronized with the incoming data stream, such that no further synchronization measures need to be taken. This method requires special sampling hardware, which causes additional costs and is normally not available in mobile telephones.

It is therefore the object of the invention to provide an autobauding function which avoids the above-mentioned problems, which causes a minimum of expense in terms of hardware and processing time, and which will correctly synchronize with the serial data transmission even if the transmitted data words immediately follow each other.

According to the invention, this object is attained by a method for automatically determining the baud rate of a serial data transmission having the features of claim 1, a corresponding apparatus having the features of claim 9 and a mobile telephone including such an apparatus. Preferred embodiments of the invention are recited in the dependent claims.

The invention is based on the idea to set a receiving device to a first (possibly incorrect) baud rate, and to determine the correct baud rate of the data transmission on the basis of the received data word and possibly further information. If the first baud rate has not been the correct one, the receiving device is set to a second baud rate, which is chosen in a way that the beginning of a subsequent data word in the serial data transmission can be detected correctly by the receiving device.

Employing the teachings of the invention, the processor does only need to program or reprogram the receiving device in a suitable way, which can be done very quickly. Thus the autobauding procedure only causes a very small processor load. In particular, it does not require the attention of the processor for an extended or continuous period of time. This enables the processor to execute other tasks concurrently under control of a time sharing operating system. The actual receiving steps may be performed by the receiving device independently from the processor. Since a typical microcontroller already contains a receiving device, the available hardware is used very well.

According to the invention, the first received data word does not need to correspond to one single baud rate. Other information, for example information obtained from a direct sampling of at least one bit value of the received signal, may additionally be used to determine the correct baud rate. In preferred embodiments, however, the first received data word uniquely identifies the baud rate, and the correct baud rate is determined solely on the basis of this data word. It is to be noted that the first received data word may be different from the first transmitted data word. For example, if the first baud rate is faster than the actual baud rate of the data transmission, the first received data word will only reflect an initial portion of the first transmitted data word.

The invention teaches to perform an intermediate step using the second baud rate to enable the receiving device to synchronize with the serial data transmission. Preferably the beginning of a predetermined subsequent data word is detected. In further preferred embodiments, the predetermined subsequent data word is the second data word in the serial data transmission, i.e. the next data word after the first one. Thus even an immediately following second data word can be read in at the correct baud rate.

The serial data transmission preferably comprises at least one predetermined autobauding data word, which may be one of the characters 'A' or 'a', and the next character in the serial data transmission may be 'T' or 't'. In preferred embodiments, a sequence of at least one, or at least two, or at least three comparisons is performed to determine the actual baud rate from the first received data word. A suitable look-up table may be used in other embodiments. This look-up table may or may not comprise an entry for the case that the first baud rate has by chance been the correct one.

In preferred embodiments, the first baud rate corresponds to the maximum baud rate detectable by the autobauding mechanism. In other embodiments the first baud rate may be higher than the maximum baud rate since it may then be possible to detect further characteristics of the serial data transmission (e.g., parity) for all admissible baud rates. The autobauding mechanism is especially reliable if slight timing variations in the serial data transmission are taken into account.

The second baud rate, to which the receiving device is set, preferably depends on the determined baud rate of the data transmission and/or on the autobauding character. In particular, the second baud rate may be set such that the receiving device will have read a full data word by the time the first actually transmitted data word ends. In preferred embodiments of the invention, the second baud rate may be faster than the determined baud rate by a factor of either ranging from 5 to 20 (preferably about 10) or ranging from 1.2 to 2 (preferably 1.5). Which of these ranges is chosen may depend on the determined baud rate.

It is further preferred to echo each received data word. A sending device connected to the processor may serve for this purpose. There may be a delay in echoing the first data word, which may be derived from the second received data word.

The receiving device, which may be a standard UART (universal asynchronous receiver/transmitter), does in preferred embodiments start to sample a signal level of the serial data transmission when a predetermined start condition is met. This start condition may be a mark-to-space transition in said serial data transmission.

Several sample embodiments of the invention will now be described in more detail with reference to the schematic drawings, in which.

Figure 2:
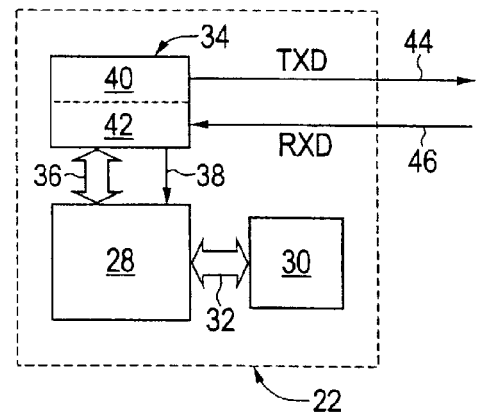
FIG. 2 shows a block diagram of a microcontroller in a first sample embodiment.
Figure 3:
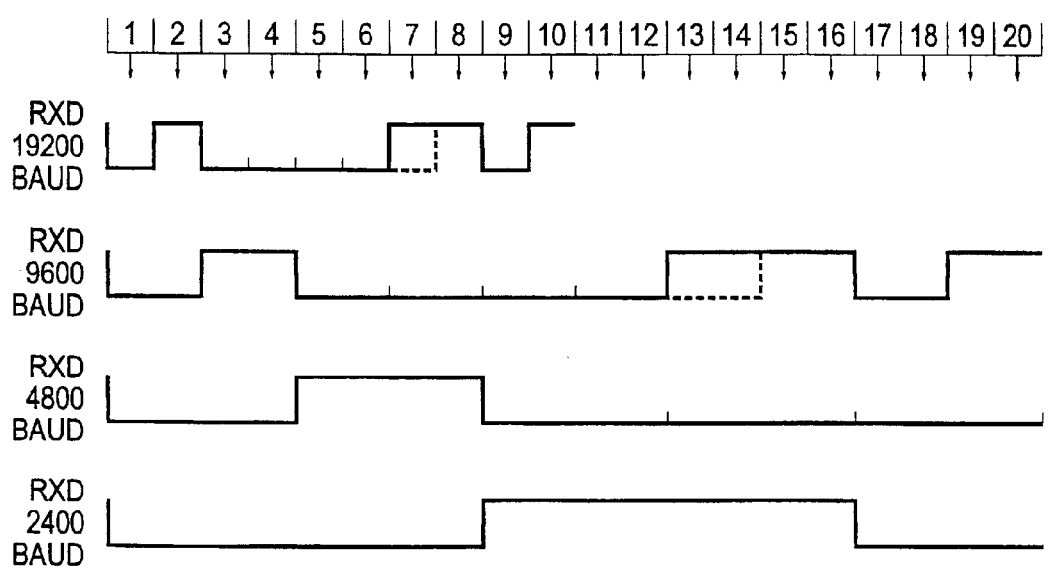
Figure 4:
Figure 5:
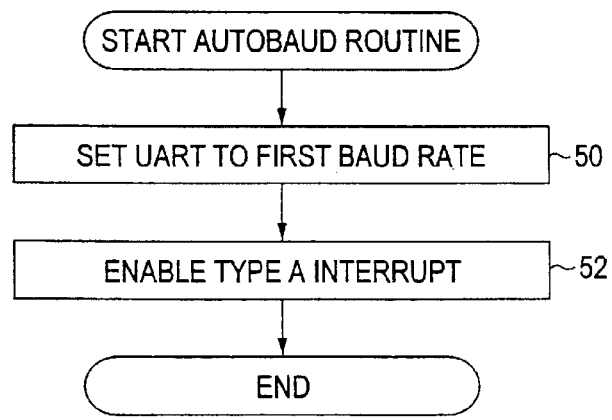
Figure 6A:
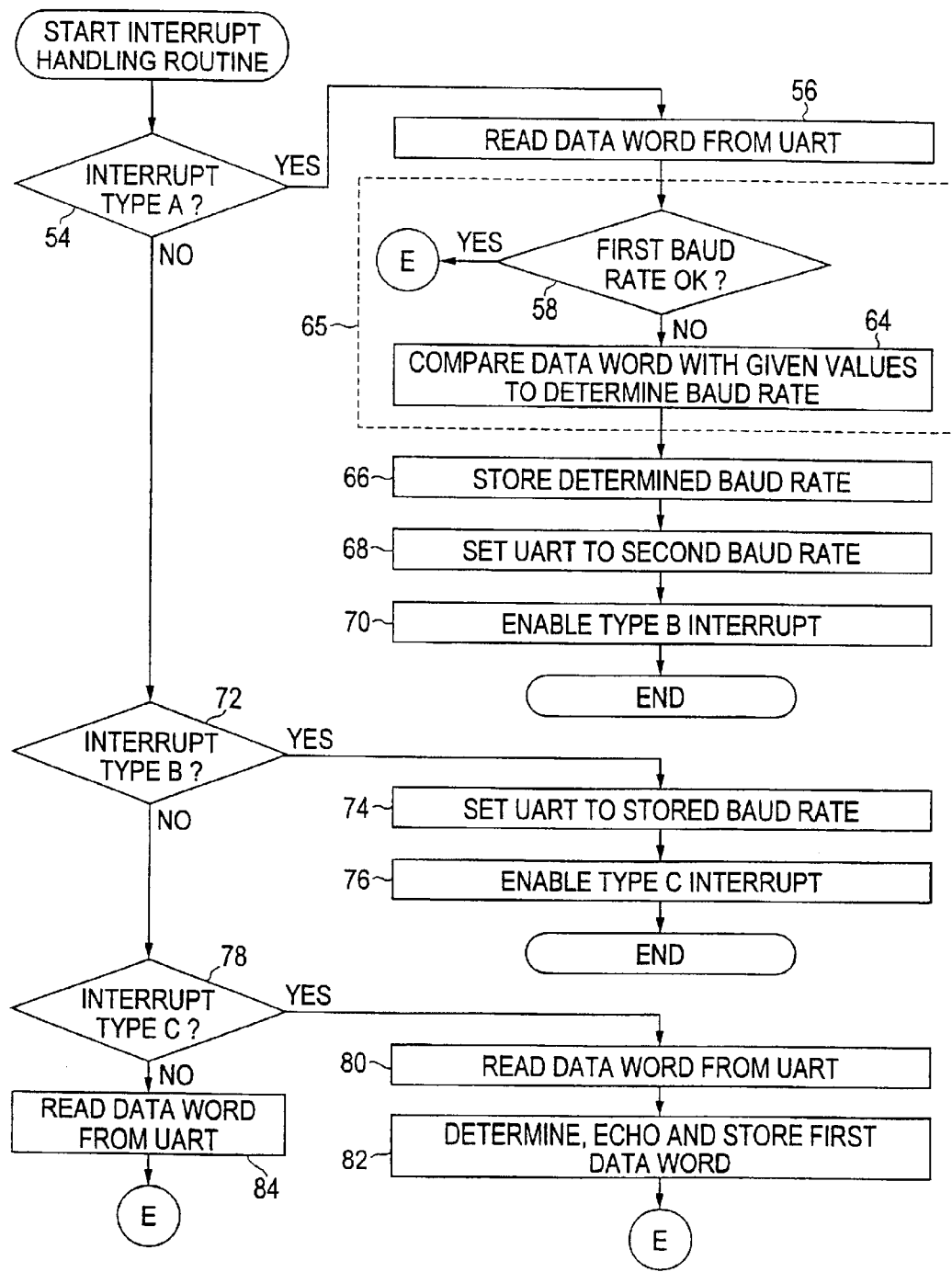
Figure 6B:
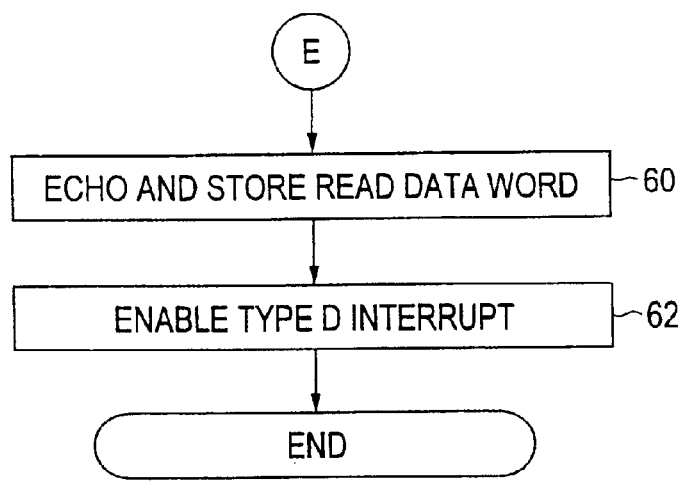
Figure 7:
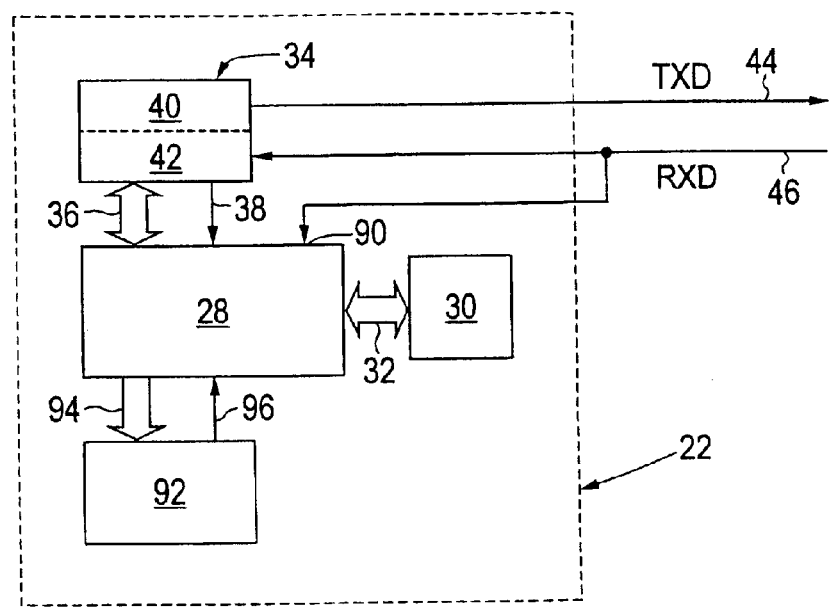

FIG. 3 shows a timing diagram of a received data signal at four different baud rates, FIG. 4 shows a timing diagram like that of FIG. 3, in which the time scale has been condensed by a factor of four, FIG. 5 shows a flow diagram of a program routine used to initiate the autobauding function, FIG. 6A and FIG. 6B together show a flow diagram of an interrupt handling routine, FIG. 7 shows a block diagram like that of FIG. 2 in a further sample embodiment.

Figure 1:
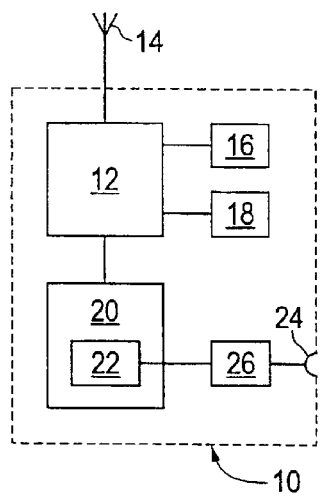
FIG. 1 shows a block diagram of a mobile telephone.

The mobile telephone 10 shown in FIG. 1 is a hand-held GSM telephone equipped with a serial interface having an autobauding capability. The interface conforms to the RS-232 or V.24 standard, but other serial communication methods may be used in alternative embodiments. All kinds of data may be transferred to and from the telephone 10 via the interface. This includes fax or other data to be sent or received via the telephone 10, data used to configure the telephone 10, and data read out from the telephone 10 for service or repair purposes.

The mobile telephone 10 as such is well known. It comprises an analog unit 12 for sending and receiving high frequency signals via an antenna 14. The analog unit 12 is connected to a speaker 16, a microphone 18 and a digital control unit 20. The control unit 20 in turn comprises an integrated microcontroller 22, which provides the serial data transmission capability, and which is connected to a serial data connector 24 via a driver circuit 26. The microcontroller 22 may be a SAB 80C166 integrated circuit manufactured by Siemens AG, Germany, or any other suitable device. A plurality of program routines, some of which are time critical, run on the microcontroller 22 in a time sharing fashion for providing the various functions of the telephone 10. Further components of the telephone 10, like a display, a keypad, and a power supply unit, are conventional and not shown in FIG. 1.

FIG. 2 depicts some of the internal components of the microcontroller 22. A processor 28 is connected to a memory unit 30 via a memory bus 32. The memory unit 30 comprises a read-only program memory and a read/write memory to store temporary data values. A UART 34 (UART=universal asynchronous receiver/transmitter) is connected to the processor 28 over an internal bus 36 and a UART interrupt line 38. The UART 34 comprises a sending device 40 to generate a transmit data signal TXD on a line 44 and a receiving device 42, to which a line 46 carrying a received data signal RXD is connected. The lines 44 and 46 and further lines for various control signals are coupled to the driver circuit 26 (shown in FIG. 1).

During operation, the UART 34 receives data words to be sent and control information from the processor 28 via the internal bus 36. The data words are sent by the sending device 40 in a serial fashion over the line 44 to the driver circuit 26, and the control information determines the serial transmission characteristics of the UART 34 with respect to sending and receiving (for example, baud rate, number of data and stop bits, and parity). The receiving device 42 of the UART 34 continuously monitors the incoming RXD signal on line 46 and converts it into data words. Whenever a complete data word is received, an interrupt is generated for the processor 28 on the UART interrupt line 38.

FIG. 3 and FIG. 4 each show four samples of a received data signal RXD at data transmission speeds of 19200 baud, 9600 baud, 4800 baud and 2400 baud, respectively. For the sake of clarity, FIG. 3 is an enlarged representation of the first 20 time intervals shown in FIG. 4. In this example, the time intervals indicated on top of FIG. 3 and FIG. 4 have a duration of 52 µs each. The arrows pointing downwards from the time intervals represent possible sample points at which the receiving device 42 of the UART 34, if set to a baud rate of 19200 baud, will sample the incoming signal RXD. In FIG. 3 and FIG. 4, a mark condition of the received signal RXD is denoted by a high level, and a space condition is denoted by a low level. Other representations are possible, depending on the characteristics of the driver circuit 26 and the UART 34.

Each of the four RXD signals of FIG. 3 and FIG. 4 corresponds to the transmission of one character 'A' or 'a'. In the ASCII code these characters are represented by data words 0x41 and 0x61, respectively (the prefix 0x denoting a hexadecimal value). As set forth in the RS-232 or V.24 standard, each transmission of a data word begins with a start bit, which is characterized by an initial mark-to-space transition followed by a space condition for one bit length. Then the data word is transmitted bit by bit, starting with the least significant bit (first bit) and ending with the most significant bit (eighth bit). At least one end bit, which is a mark condition during at least one bit length, concludes the transmission.

Consider, for example, an RXD signal sent at 19200 baud. The start bit is transmitted in time interval 1, followed by the least significant bit (a binary 1) in time interval 2. Subsequently, there are four binary 0 bits and two binary 1 bits if the character 'a' is transmitted (continuous line in FIG. 3 and FIG. 4), or five binary 0 bits and one binary 1 bit for the character 'A' (dashed line in FIG. 3 and FIG. 4). The most significant data bit (binary 0) is sent in time interval 9, and the stop bit is sent in time interval 10. The start bit of the next character may follow immediately after time interval 10. For slower transmission speeds, the bit length of each individual bit is increased accordingly.

FIG. 3 and FIG. 4 show an example of an "8 data bits, no parity" transmission characteristic. In other transmission characteristics, the eighth data bit may be replaced by a so-called parity bit. This parity bit may always be a binary 0 ("space parity"), or always a binary 1 ("mark parity"), or it may be chosen such that the total number of binary 1 bits in the transmitted data word is even or odd, respectively ("even parity" or "odd parity").

In the example embodiments described herein, the autobauding procedure expects to receive either the characters "AT" or "at" as the first two data words. This command prefix is well-known and standardized by the V.25ter standard. The first character serves as an autobauding character and is sufficient to determine the correct baud rate and the beginning of the second character. The second character is read correctly. Since the autobauding function may be unable to obtain any information about the first character, the second character is used to determine the first one. In alternative embodiments, another autobauding character or other autobauding characters may be used.

First an embodiment of the invention will be described in which the autobauding character must be sent either in a "8 data bits, no parity" or in a "7 data bits, space parity" transmission characteristic, as shown in FIG. 3 and FIG. 4.

FIG. 5 shows how the autobauding process is initiated. The processor 28 sets the UART 34 to the transmission characteristic of 8 data bits, no parity and a first baud rate (box 50). The first baud rate is 19200 baud in the present sample embodiment. Then the UART interrupt is enabled. A suitable marker value is stored in the memory unit 30, designating the current stage of the autobauding process (box 52). This marker value will be referred to as an "interrupt type" in the following, since it determines the functions to be performed upon the occurrence of a UART interrupt. In the present case, a type A interrupt is enabled. For the sample embodiments described herein, the actual interrupt signal on line 38 is the same for all interrupt types, the distinction being made only on the basis of the marker value. In alternative embodiments, the interrupt types may be distinguished on the hardware level.

The initial stage of the autobauding routine is now finished, and the processor 28 is free to perform other tasks necessary for the operation of the mobile telephone 10. The receiving device 42 of the UART 34 will continually monitor the RXD signal for the occurrence of a start bit (mark-to-space transition). After completion of the start bit in time interval 1 (FIG. 3 and FIG. 4), the UART 34 samples the next 8 data bits at the predetermined first baud rate of 19600 baud (time intervals 2 to 9 in FIG. 3 and FIG. 4). When the stop bit is detected in time interval 10, the UART 34 generates an interrupt on line 38.

Upon occurrence of the UART interrupt, the processor 28 performs the interrupt handling routine shown in FIG. 6A and FIG. 6B. A maximum interrupt response time of 100 μs is required. The processor 28 first determines the type of the interrupt by looking up the marker value stored in the memory unit 30. If the maker value designates a type A interrupt (test 54), the processor 28 reads the data word received by the UART 34 (box 56). This data word contains the samples of the RXD signal taken in time intervals 2 to 9. These samples uniquely characterize the baud rate of the data transmission for the range of transmission speeds considered in this sample embodiment. In alternative embodiments, a larger range of baud rates may be used, such that the first data word only identifies a group of several possible baud rates. In these embodiments, further samples are taken either by the UART 34 or by other suitable means.

If the first baud rate has by chance been the correct one, the data word read by the receiving device 42 of the UART 34 will be 0x41 or 0x61, corresponding to the characters 'A' or 'a'. This condition is detected in test 58. If this is the case, execution branches to entry point E shown in FIG. 6B. Here, the processor 28 first writes the received data word into an appropriate send register of the sending device 40. This causes the received data word to be echoed on line 44 at the set first baud rate (box 60). The received data word is also stored in an appropriate buffer section of the memory unit 30 for further processing during normal operation of the mobile telephone 10. Next, a type D interrupt is enabled (box 62). The occurrence of such an interrupt signals that a further character has been received, which may be processed without performing any autobauding steps.

If the first baud rate has not been the correct one, it is nevertheless possible to determine the correct baud rate from the data word read by the UART 34. If, for example, the actual transmission speed is 9600 baud, the RXD signal assumes a mark state only during the time intervals 3 and 4, and a space state otherwise. Considering that the least significant bit is transmitted first, this corresponds to a data word of 0x06 (00000110 in binary notation or 01100000 in the order of the actual data transmission). For the other possible baud rates, the expected data words sampled by the UART 34 can derived in a similar fashion. The following table summarizes the relation between the expected data words and the baud rate determined therefrom. The role of the second baud rate will be explained later.

| exp. data word | determined baud rate | second baud rate |
|---|---|---|
| 0x06 | 9600 baud | 100000 baud |
| 0x78 | 4800 baud | 50000 baud |
| 0x80 | 2400 baud | 3000 baud |
| 0x00 | 1200 baud | 1500 baud |

In step 64 shown in FIG. 6A, the processor 28 compares the data word read from the UART 34 with several given values in order to determine the correct baud rate. In the present sample embodiment, the given values are exactly the expected data words of the above table. In alternative embodiments, the admissible baud rates may be such that slight timing variations may cause several different first data words to be received for one particular baud rate. All these possible values are then considered valid representations of the corresponding baud rate.

Test 58 and step 64 together form a step 65 of determining the correct baud rate on the basis of the first received data word. Step 64 may be implemented using a series of successive comparisons or a look-up table. If a look-up table is employed, it may also comprise entries for the expected characters (i.e. 'A' and 'a' and the present sample embodiment). The look-up step may then replace test 58.

When the correct transmission baud rate has been determined, it is stored in the memory unit 30 (box 66). At this time (in time interval 10 or shortly thereafter) the transmission of the first data word is not yet finished. If the UART 34 was programmed with the determined baud rate immediately, the next mark-to-space transition would be interpreted as the beginning of the start bit of the next transmitted data word, which would cause the second data word to be read incorrectly. For example, at a transmission speed of 9600 baud, the UART 34 would consider the space bit in time intervals 17 and 18 as the start bit of the second data word and would start sampling data bits too early.

In order to enable the UART 34 to find the beginning of the next (i.e., second) data word transmission, the autobauding method provides an intermediate step, in which the UART 34 is set to a second baud rate (box 68). The second baud rate corresponds to a sampling speed which causes the remainder of the first character (up to its trailing stop bit) to be interpreted by the UART 34 as a full data word. The value of the second baud rate depends on the determined transmission baud rate (box 64) and on the expected autobauding character or characters. For the sample embodiments described herein, the second baud rate is given in the above table. It will be described later how these values are derived.

After the UART 34 has been set to the second baud rate, the processor 28 enables a type B interrupt (box 70), which means that the next interrupt of the UART 34 signals the end of the intermediate step. The interrupt handling of the type A interrupt is now finished. While the processor 28 may perform other tasks, the UART 34 will wait for the next mark-to-space transition of the RXD signal. When the UART 34 detects this transition, the remainder of the first transmitted character is read using the second baud rate sampling speed, and an interrupt will be issued as soon as the stop bit is reached.

This interrupt is classified as a type B interrupt by the interrupt handling routine (test 54 branch "NO" and test 72 branch "YES"). The UART 34 is now programmed by the processor 28 to use the correct baud rate (box 74), which has been determined and stored during the handling of the previous type A interrupt (boxes 64 and 66). For example, in the case of a 9600 baud transmission, the type B interrupt will occur during time interval 18 or 19, leaving enough time for the processor 28 to respond to the interrupt and reprogram the UART 34 before the transmission of the next character starts in time interval 21.

The processor 28 now enables a type C interrupt (box 76) by writing a suitable marker value in the memory unit 30. Then the processor 28 resumes its normal mode of operation while the UART 34 receives the second character at the correct baud rate.

The occurrence of a type C interrupt signifies that the second character has been received by the UART, while the first character has not yet been echoed. This interrupt type is detected via test 54 (branch "NO"), test 72 (branch "NO") and test 78 (branch "YES"). The processor 28 first reads the second data word from the UART 34 (box 80). In the presently described sample embodiment, this data word may either be a 'T' or a 't'. Since the first two data words were assumed to be either "AT" or "at" (not "aT" or "At"), the information about the second character allows the processor 28 to determine the first one (box 82). The thus determined first data word will now be echoed on line 44 and stored in the buffer section of the memory unit 30 for further processing (box 82). Execution continues at entry point E shown in FIG. 6B. The received (second) character is echoed and stored (box 60), and a type D interrupt is enabled (box 62). This completes the autobauding steps.

The type D interrupt signals that a new data word has been received by the UART 34 during normal operation. No autobauding steps are necessary in this case. When a type D interrupt is determined ("NO" branches of tests 54, 72 and 78), the processor 28 reads the received data word from the UART 34 (box 84), echoes and stores it (box 60) and again enables the type D interrupt (box 62).

In box 68 shown in FIG. 6A, the UART 34 is set to the second baud rate in order to perform a suitable intermediate step, which allows synchronization of the UART 34 with the beginning of the next (second) data word. Consider, for example, the case of a 9600 baud data transmission. Here the UART 34 detects the mark-to-space transition at the beginning of time interval 17 and begins the intermediate step. The UART 34 is then expected to finish the intermediate step and issue a type B interrupt early in time interval 19, thus giving the processor 28 enough time to respond to the interrupt and to reprogram the UART 34 (box 74). This means that the UART 34 must perform about ten sampling operations in at most two time intervals or 104 $\mu s$, which corresponds to a second baud rate of at least 100000 baud.

Appropriate second baud rate values for the other data transmission speeds can be calculated in a similar way. For transmission speeds of 2400 baud and below, the UART 34 will detect a first mark-to-space transition after the first data bit has been transmitted (at the beginning of time interval 17 in the case of a 2400 baud transmission). Since there will be a further mark-to-space transition at the beginning of the final data or parity bit (time interval 65 in the case of a 2400 baud transmission), the second baud rate is set to a value only slightly higher than the determined baud rate in the present sample embodiment. This ensures that the intermediate step ends shortly before or during the stop bit interval of the first data word. In alternative embodiments, the second baud rate may be set to a rather high value (for example, 25000 baud) also for data transmission speeds of 2400 baud and below. Two intermediate steps are then necessary to find the correct start bit of the next (second) transmitted data word.

In the sample embodiments described so far, the data word read by the UART 34 during the intermediate step is disregarded. For 9600 baud and 4800 baud transmission speeds, this data word essentially contains samples of the final data or parity bit, which was assumed to be a space bit. For transmission speeds of 2400 baud and below, however, the values of six or more of the transmitted data bits can be derived from the received data word. In particular, this includes the sixth data bit, which distinguishes upper and lower case characters, and the eighth data or parity bit. This information may be used in alternative embodiments to echo the first received character immediately and/or to determine information about the type of parity used during the data transmission. In some embodiments only such baud rates are considered valid for which this further information may be gathered.

For example, in an alternative embodiment the second baud rate might be set to 3200 baud if the first received data word has been 0×80 (indicating a transmission speed of 2400 baud). After the second mark-to-space transition has occurred at the beginning of time interval 17, samples will be taken during the time intervals 19/20, 25/26, 31/32, 37/38, 43/44, 49/50, 55/56, 61/62, 67/68 and 73/74. The data word received during the intermediate step can then be used to determine the case of the first transmitted data word (autobauding character) and the value of the parity bit according to the following table:

| intermediate data word | first character | parity bit |
|---|---|---|
| 0x70 | a | 0 |
| 0x40 | A | 0 |
| 0xF0 | a | 1 |
| 0xC0 | A | 1 |

In this case it is important to take slight timing variations into account. If the data was transmitted about 2% faster and an upper case 'A' was sent, the intermediate data word would be 0×60 instead of 0×40 (or 0×E0 instead of 0×C0) since the rising edge of data bit 6 would occur before the sampling point in time interval 55/56. A similar shifting happens at sampling point 49/50 if a lower case 'a' is transmitted about 2% slower. Consequently, several intermediate data words, which differ only in that certain bit positions are shifted, will be accepted as representations for the expected data words given in the above table.

Most of the sample embodiments described so far assumed the incoming data to have either an "8 data bits, no parity" or a "7 data bits, space parity" format. This is required to ensure that the UART 34 will receive a mark-to-space transition to initiate the intermediate step at data transmission speeds of 9600 baud and 4800 baud. FIG. 7 shows a further embodiment of the microcontroller 22, which may be used to perform the autobauding procedure for the above and various further transmission characteristics.

In FIG. 7, the processor 28 comprises a digital input port 90, to which the RXD signal on line 46 is connected. A timer 92 is provided in the microcontroller 22. The timer 92 may be programmed by the processor 28 via a control bus 94. When the programmed time interval is over, the timer 92 will issue a timer interrupt on a timer interrupt line 96.

The digital input port 90 and the timer 92 are used by the processor 28 to sense the bit value or level of the RXD signal at predetermined times. The processor 28 may thus determine the value of the sixth data bit (distinguishing upper and lower case characters) and/or of the eighth data bit or parity bit. Consider, for example, that a data transmission speed of 9600 baud has been detected (box 64 in FIG. 6A) during time interval 10. In order to determine the value of the parity bit (or the eighth data bit), the processor 28 sets the timer 92 to issue an interrupt after 7 further time intervals. The timer interrupt will thus occur in time interval 17, and the processor 28 may determine the parity bit value by sensing the RXD signal at the digital input port 90. Other delay times are used for other data transmission speeds.

As mentioned above, the mark-to-space transition required to initiate the intermediate step may be missing for digital data transmissions having a speed of 9600 baud or 4800 baud and a characteristic of 7 data bits and an even, odd or mark parity bit. By determining the value of the parity bit in the way described in the previous paragraph, the processor 28 can find out whether such a mark-to-space transition has occurred. If a space parity bit is detected by the processor 28, the intermediate step has been correctly initiated. If the processor 28 detects a mark parity bit, there has been no mark-to-space transition, such that the intermediate step is not necessary. The processor 28 will then reprogram the UART 34 to the determined baud rate and enable a type C interrupt (similar to boxes 74 and 76 in FIG. 6A), thus skipping the intermediate step.

In further alternative embodiments, the information about the parity bits of the first two data words is used to determine the parity characteristics of the transmission, and to program the UART 34 accordingly. In yet further embodiments, the timer 92 is also used to detect the upper or lower case of the first received character, such that it can be echoed immediately. The sampling features of the microcontroller 22 of FIG. 7 may further be used to determine a very wide range of baud rates, which cannot be uniquely identified on the basis of the first read data word alone.

In further alternative embodiments any status flags generated by the UART 34 may be taken into account when determining the baud rate or other transmission characteristics. The invention may also be used for determining other baud rates or other baud rate ratios than those described above. In particular, all baud rates given in this descrition may be multiplied by two, four, or any other power of two. The invention is not restricted to be applied in mobile telephones, but may instead be used in connection with all types of serial data transmissions between data terminal equipment (DTE) and data communications equipment (DCE).

What is claimed is:

1. A method for automatically determining the baud rate of a serial data transmission, said method comprising the steps of:

a) setting a receiving device to a first baud rate, b) processing information comprising a first data word received by said receiving device to determine said baud rate of said data transmission, c) if the determined baud rate differs from said first baud rate, performing at least one intermediate step in which said receiving device is set to a further baud rate corresponding to a sampling speed which causes a further portion of the first data word in said serial data transmission to be read in by said receiving device, and, after said at least one intermediate step has been performed, setting said receiving device to said determined baud rate such that said receiving device will find the beginning of a subsequent data word in said serial data transmission and will read in said subsequent data word.

2. The method of claim 1, wherein step b) comprises at least one of the steps of determining whether said baud rate of said data transmission is equal to said first baud rate and the step of comparing said first data word received by said receiving device with at least one predetermined value.

3. The method of claim 1, wherein said first baud rate is the maximum baud rate of said serial data transmission.

4. The method of claim 1, wherein said subsequent data word in said serial data transmission is the next data word after a first data word in said serial data transmission, said first data word in said serial data transmission at least partially corresponding to said first data word received by said receiving device.

5. The method of claim 1, wherein said second baud rate depends on said determined baud rate.

6. The method of claim 1, wherein said second baud rate is fast enough such that any remaining portion of said first data word in said serial data transmission will be read by said receiving device as a full data word.

7. The method of claim 1, wherein, for at least one of said determined baud rates, said second baud rate is faster than said determined baud rate.

8. The method of claim 7, wherein, for at least one of said determined baud rates, said second baud rate is less than 50% faster than said determined baud rate.

9. The method of claim 1, wherein, for at least one of said determined baud rates, said second baud rate is fast enough such that at most two bits of said serial data transmission will be read by said receiving device as a full data word.

10. The method of claim 1, further comprising the step of determining a bit value of said serial data transmission independently from said receiving device.

11. The method of claim 1, further comprising the step of echoing each received data word.

12. The method of claim 11,
wherein the first echoed data word is derived from the second transmitted data word.

13. The method of claim 1,
wherein said receiving device starts to sample a signal level of said serial data transmission when said signal level meets a predetermined start condition.

14. An apparatus for automatically determining the baud rate of a serial data transmission,
said apparatus comprising a processor and a receiving device,
said processor setting said receiving device to a first baud rate,
said processor processing information comprising a first data word received by said receiving device to determine said baud rate of said data transmission,
said processor, if the determined baud rate differs from said first baud rate, performing at least one intermediate step in which said receiving device is set to a further baud rate corresponding to a sampling speed which causes a further portion of the first data word in said serial data transmission to be read in by said receiving device, and, after said at least one intermediate step has been performed, setting said receiving device to said determined baud rate such that said receiving device will find the beginning of a subsequent data word in said serial data transmission and will read in said subsequent data word.

15. The apparatus of claim 14,
further comprising a timer programmable by said processor, and wherein said processor comprises an input port for determining a bit value of said serial data transmission independently from said receiving device at a time determined by said timer.

16. The apparatus of claim 14,
wherein said processor further determines, when processing said information comprising said first data word, whether said baud rate of said data transmission is equal to said first baud rate.

17. The apparatus of claim 14,
wherein said processor is further compares said first data word received by said receiving device with at least one predetermined value.

18. The apparatus of claim 14,
wherein said subsequent data word in said serial data transmission is the next data word after a first data word in said serial data transmission, said first data word in said serial data transmission at least partially corresponding to said first data word received by said receiving device.

19. The apparatus of claim 14, wherein, for at least one of said determined baud rates, said second baud rate is faster than said determined baud rate.

20. A mobile telephone comprising an apparatus for automatically determining the baud rate of a serial data transmission,
said apparatus comprising a processor and a receiving device,
said processor for setting said receiving device to a first baud rate,
said processor processing information comprising a first data word received by said receiving device to determine said baud rate of said data transmission,
said processor, if the determined baud rate differs from said first baud rate, performing at least one intermediate step in which said receiving device is set to a further baud rate corresponding to a sampling speed which causes a further portion of the first data word in said data transmission to be read in by said receiving device, and, after said at least one intermediate step had been performed, setting said receiving device to said determined baud rate such that said receiving device will find the beginning of a subsequent data word in said serial data transmission and will read in said subsequent data word.

* * * * *